(No Model.)  2 Sheets—Sheet 1.
H. REISSING.
JUG FOR BEER, &c.
No. 558,660.  Patented Apr. 21, 1896.
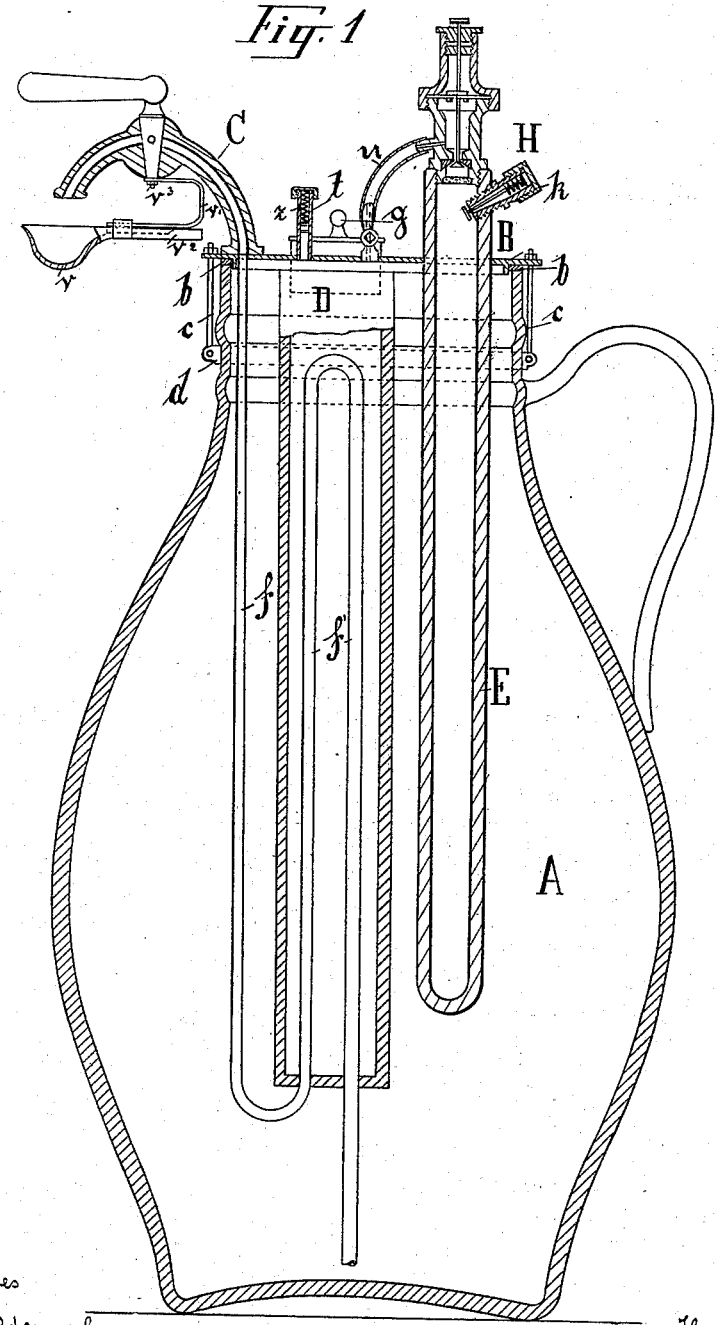

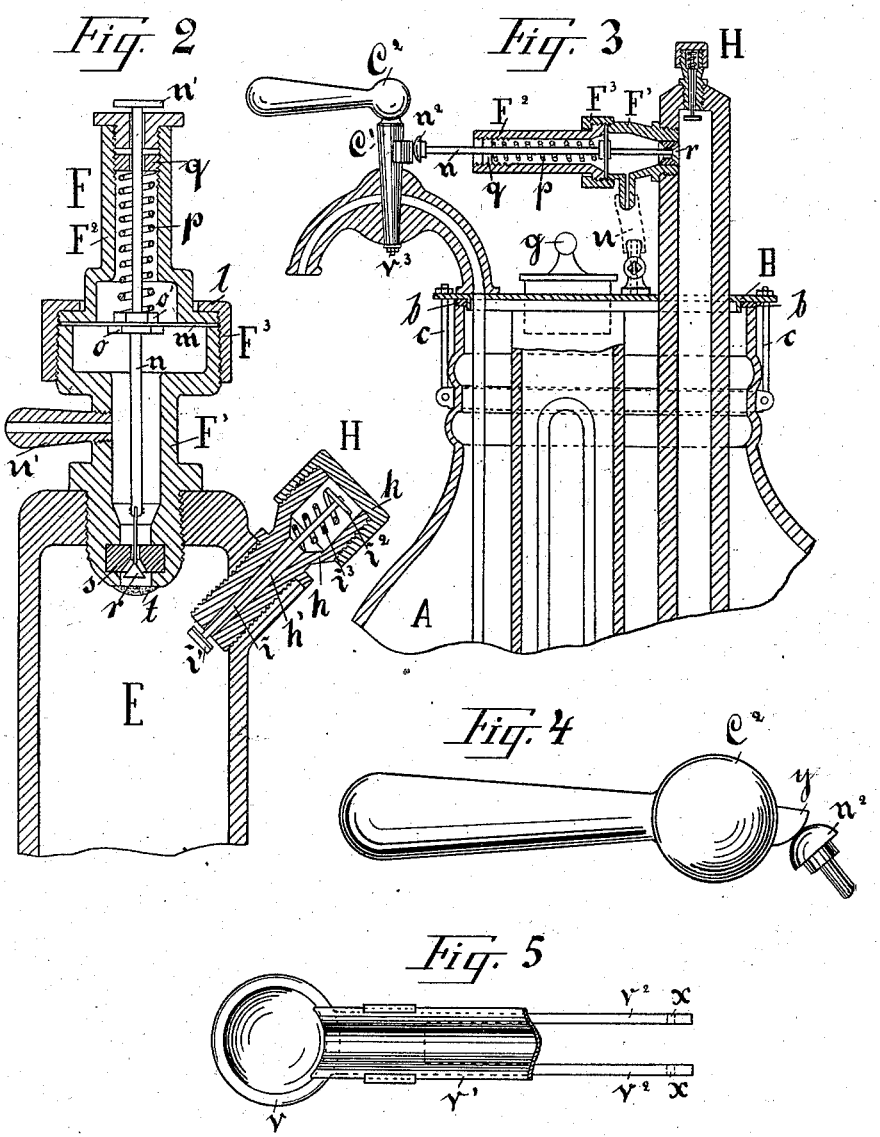

UNITED STATES PATENT OFFICE.

HEINRICH REISSING, OF BERLIN, GERMANY.

JUG FOR BEER, &c.

SPECIFICATION forming part of Letters Patent No. 558,660, dated April 21, 1896.

Application filed September 21, 1895. Serial No. 563,162. (No model.)

*To all whom it may concern:*

Be it known that I, HEINRICH REISSING, merchant, of No. 79 Landsbergerstrasse, Berlin, Germany, have invented an Improvement in Jugs for Beer, &c., of which the following is a specification.

It is a well-known fact that really good and fresh beer can only at present be obtained at breweries or in restaurants where the beer is drawn directly from the cask. For household use people must always be satisfied with the much less palatable and agreeable bottled beer, or must fetch beer in open jugs from the places where the same is drawn from the cask. In such jugs, however, the beer very soon becomes flat and loses its good taste owing to its long contact with atmospheric air. It is much too inconvenient to procure an entire cask for a household, and, further, beer even in the cask does not keep long enough without the necessary carbonic-acid apparatus after some has been drawn off. These drawbacks are removed by the improved beer jug or vessel which forms the object of this invention.

The invention consists of a jug or vessel for conveying beer, which jug is more particularly intended for household use, and in which the beer or other liquid which becomes flat on exposure to the air keeps fresh and palatable for several days, even when some of the beer, or the like, is drawn off at various times from the same.

The invention consists, essentially, in securing in an air-tight manner a cover on a beer jug or vessel formed of any suitable material, which cover is provided with an apparatus consisting of a draw-off tap, an ice-holder projecting into the jug, a cooling pipe or worm connected with the ice-holder and running to the draw-off tap, and a carbonic-acid bottle, which also projects into the interior of the jug, and from which the carbonic acid is conveyed into the interior of the jug by an automatically self-adjusting feeding device and a safety-valve.

In the accompanying drawings, Figure 1 is a vertical section of the jug or vessel. Fig. 2 is a vertical section of the upper part of the carbonic-acid bottle, together with the inlet-valve arranged at the upper end of the same and the valve for regulating the transfer of carbonic acid to the jug or vessel. Fig. 3 is a partial vertical section of a modified form of construction. Fig. 4 is a detail of Fig. 3. Fig. 5 is a plan view, on a larger scale, of a dripping-cup device employed with the form of construction shown in Fig. 1.

The jug A is formed of glass, earthenware, or any other suitable material. It is closed by a cover-plate B, which is rendered tight by means of an india-rubber ring or washer $b$ and is tightened up or secured by means of three screws $c$. These screws are pivotally connected at their lower ends to a metal ring $d$, which is lodged in a small groove in the neck of the vessel. On the upper cover-plate B of the jug a draw-off tap or cock C is arranged, with a pipe $f$ running to the bottom of the jug.

An ice-holding vessel D inserted in the jug serves for cooling the beer or other liquid. This holder consists of a wide metal tube, closed at the bottom and having its upper end let into a suitable opening in the cover-plate of the jug and attached thereto. The upper open end of the ice-holder is closed by a suitable lid or cover $g$. The pipe $f$ leading to the draw-off tap forms a cooling-worm $f'$ in the ice-holder and is for this purpose bent up into the ice-holder and down again in the form of a curve. A carbonic-acid bottle E, made of compressed steel, is also inserted in the cover-plate of the jug and is screwed into the said cover-plate in such a way that its lower end projects into the interior of the jug. At the upper end of the carbonic-acid bottle is an inlet-valve H, the casing $h$, Fig. 2, of which is screwed into the side of the carbonic-acid bottle and has a central bore $h'$, which widens toward the upper end. In this bore is a valve-spindle $i$, which has at its under end a knob or button $i'$ and another, $i^2$, at its upper end. A spring $i^3$ is coiled round the upper end of the spindle and presses with one end against the upper button or knob $i^2$ and with the other bears against a seat, which is formed by a narrowing of the valve-bore. A screwed cap $k$ on the valve-casing $h$ protects the device externally.

In order to convey carbonic acid through the inlet-valve into the carbonic-acid receiver or bottle, the outer cap $k$ is taken off and the inlet-valve is connected with a carbonic-acid supply. The pressure of the carbonic acid then presses the lower knob $i'$ inward against the pressure of the spring $i^3$ and carbonic acid can thus enter the bottle B. When the filling is completed, the valve closes itself automatically as soon as the pressure in the interior of the bottle B, in combination with the pressure of the spring $i^3$, has become greater than the outside pressure—that is, than the pressure of the carbonic acid contained in the supply-vessel. After the bottle B has been disconnected (unscrewed) from the supply-bottle the valve-case $h$ is closed by screwing on the outer cap $k$.

The lower knob of the valve-spindle $i$ is preferably screwed on the spindle, which is threaded, and may be adjusted on the same in order to impart any desired pressure to the spring $i^3$. The transfer of carbonic acid from the carbonic-acid bottle B to the interior of the jug A is regulated by means of a second valve F. This consists of a valve-case F', Fig. 2, which is screwed into the top of the carbonic-acid vessel and above which is placed a spring-case F$^2$. The latter is screwed onto the valve-case F' by means of a screwed cap or sleeve F$^3$, having an internal flange $l$. An india-rubber diaphragm $m$ is strained firmly between the valve-case F' and the spring-case F$^2$.

In the center of the valve and spring cases is a valve-spindle $n$. This is passed through the diaphragm and firmly connected therewith by means of two screw-nuts $o\,o'$. A spring $p$ presses on the upper nut $o'$, which spring may be tightened or loosened by means of a screwed stop $q$, according to requirements. At the lower end of the valve-spindle $n$ is a conical plug or stopper $r$. This fits exactly on the valve-seat $s$, formed in the under end of the valve-case, which seat is preferably made of vulcanite. A small sieve $t$ is arranged under the conical valve-plug, and has for its object to retain any particles of dust contained in the carbonic-acid bottle. At the upper end of the valve-spindle is a press-button $n'$. A short tube $u$ connects the interior of the valve-case F' with the interior of the jug, and when the conical valve-plug $r$ is opened the carbonic acid passes into the valve-case F' and flows from there through a nipple $u'$ into the above-mentioned short tube $u$ and thus into the jug A.

The regulation of the supply of carbonic acid takes place automatically by means of the valve. The spring $p$ over the diaphragm $m$ tends to press the valve-spindle $n$, together with the conical valve-plug $r$, downward, and the carbonic acid can enter the space beneath the diaphragm and from thence pass through the nipple $u'$ and the short pipe $u$ into the jug or vessel A. As soon, however, as the pressure under the diaphragm $m$ has, through the carbonic acid flowing out of the bottle, become greater than the counter-pressure of the spring $p$ the carbonic acid presses the diaphragm, together with the valve-spindle $n$ and the conical plug $r$, upward, and consequently closes the valve $r$. Only when part of the contents is drawn from the jug, and the pressure in the same consequently diminishes, does the action of the spring $p$ again come into play and open the valve $r$. The process previously described is then again repeated.

In case the automatic supply of carbonic acid for some cause does not work it is only necessary to press on the external button $n'$ in order to open the valve.

A dripping-cup is preferably arranged on the draw-off cock of the beer-jug. This is so attached to the plug of the cock that it must move with the cock, and when the same is opened at once simultaneously turn to one side. This dripping-cup device consists of a spoon-shaped cup $v$, attached to a loop-piece $v'$, screwed on the under end of the plug of the tap. The under arm of this loop-piece $v'$ is preferably so arranged that it forms a channel in which the liquid which escapes at the screw $v^2$ at the lower end of the tap-plug can run into the spoon, Figs. 1 and 5.

The dripping-cup device is arranged in such a way that it can simultaneously act as a check against any unauthorized drawing-off of the beer or the like. For this object it is adjustably arranged on the loop-piece $v'$, and the shank $v^3$ of the spoon is forked and provided with eyelets $x$, Fig. 5, at the end, through which a cord may be passed, to which a seal is attached. If then it be desired to secure the tap against any unauthorized opening, the spoon $v$ is pushed back to the right, so that the two arms of its fork-shaped shank embrace the neck of the cock C, the two ends projecting on the other side. A cord may then be easily drawn through the eyelets $x$ and a seal attached thereto.

Another form of construction of the beer-jug is shown in Fig. 3 and differs essentially from that previously described and shown in Figs. 1 and 2 in the means of conveying the carbonic acid from the carbonic-acid vessel into the jug and in the arrangement of the necessary regulating-valve F. In this case the regulating-valve is not, as in the previous form of construction, placed vertically on the carbonic-acid bottle, but horizontally on the side of the latter. In this second form of construction the valve-spindle is extended to close up to the plug of the cock C and ends in a knob $n^2$. A cam or projecting piece $y$ is formed on the plug of the cock C at the same level as the knob $n^2$. When the tap is turned, the cam $y$ encounters the knob $n^2$ of the valve-spindle $n$ and pushes the latter toward the carbonic-acid bottle, thereby opening the valve $r$, so that carbonic acid can pass from the bottle B into the jug A. The cam $y$ is so arranged that it only encounters the knob $n^2$ when the cock is almost entirely opened. This arrangement has mainly for its object to admit carbonic acid to the jug when the pressure in the latter is insufficient.

Ordinarily it suffices to only partially open the cock, so that the cam $y$ does not come in contact with the knob $n^2$. When, however, the beer or the like in consequence of insufficient pressure does not flow with sufficient force or even ceases to flow from the cock C, the latter is carefully turned farther until the cam opens the carbonic-acid valve $r$. The same device, however, may with slight modification be adapted for automatic self-regulation. Until the cam comes in contact with the valve-spindle, the regulation of the supply of carbonic acid takes place automatically, in the same manner as hereinbefore described, by means of a spring, which is arranged in the valve-case on the outer left-hand side of the diaphragm. A spring is arranged on the other side of the diaphragm, but may, however, be entirely omitted, and has for its object to act against the pressure of the cam. Finally, the apparatus has a safety-valve of the ordinary kind, which opens and allows a portion of the carbonic acid contained in the jug to escape as soon as the pressure becomes too great.

The beer-jug is preferably filled with the lid or cover-plate B closed. The cock C of the jug is connected by means of a short flexible pipe with the tap of the cask from which the beer is to be drawn. The beer can then flow into the jug through the tube without foaming. Before filling the jug it is advisable to expel all the air from the same by letting in some carbonic acid in order that the beer shall not come in contact with atmospheric air.

The beer or the like may be cooled by ice in small pieces being inserted in the cylinder D. Heat is also absorbed from the beer or the like contained in the jug by the carbonic acid or the carbonic-acid vessel which projects into the jug.

Having now particularly described and ascertained the nature of my said invention and in what manner the same is to be performed, I declare that what I claim is—

1. A jug or vessel for carrying or containing beer and the like, having an air-tightly-closed lid B provided with a draw-off tap C, an ice-holder D projecting into the jug, said ice-holder having a pipe $f$ running from the bottom of the jug A to the draw-off tap, thus forming a cooling-worm $f'$, a carbonic-acid bottle E projecting into the interior of the jug A and having an automatic regulating-valve, and finally a safety-valve; all for the purpose of enabling the beer or the like to be cooled as desired in the jug, and kept a long time in a fresh and palatable condition, even after some of the contents have been drawn off at various times, substantially as described.

2. In combination, the jug, the carbonic-acid holder connected therewith, the valve controlling said connection, the spring for pressing the valve normally open, the diaphragm for closing the valve automatically when the pressure in the jug is sufficient, the faucet or cock and the cam thereon for operating the valve, said valve being controlled automatically when disengaged from said cam, substantially as described.

3. In the jug or vessel of the kind described for carrying or containing beer, the arrangement of a dripping-cup device on the draw-off cock, consisting of a spoon-shaped cup $v$, which is connected with the cock-plug C in such a way that when the cock is opened the dripping-cup device is simultaneously turned to one side, but when the cock is again closed, it is again brought under the discharge-orifice, said dripping-cup device being further provided with a forked shank $v^2$ which may be pushed backward over the end of the neck of the tap for the purpose of enabling a seal to be attached thereto so as to secure the cock against unauthorized opening substantially as set forth.

In testimony that I claim the foregoing as my invention I have signed my name in presence of two subscribing witnesses.

HEINRICH REISSING.

Witnesses:
WM. HAUPT,
THEODOR REISSING.